US009501311B2

(12) United States Patent
Lee et al.

(10) Patent No.: US 9,501,311 B2
(45) Date of Patent: Nov. 22, 2016

(54) APPARATUS AND METHOD FOR MULTICORE EMULATION BASED ON DYNAMIC CONTEXT SWITCHING

(71) Applicant: Electronics and Telecommunications Research Institute, Daejeon (KR)

(72) Inventors: Jae Jin Lee, Daejeon (KR); Young Su Kwon, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 14/602,857

(22) Filed: Jan. 22, 2015

(65) Prior Publication Data

US 2015/0212849 A1     Jul. 30, 2015

(30) Foreign Application Priority Data

Jan. 28, 2014   (KR) .......................... 10-2014-0010560

(51) Int. Cl.
*G06F 9/46* (2006.01)
*G06F 9/455* (2006.01)

(52) U.S. Cl.
CPC ............. *G06F 9/461* (2013.01); *G06F 9/455* (2013.01)

(58) Field of Classification Search
None
See application file for complete search history.

(56) References Cited

U.S. PATENT DOCUMENTS

| 2006/0212677 | A1* | 9/2006 | Fossum ................. G06F 1/3237 712/1 |
| 2008/0148015 | A1* | 6/2008 | Takamoto ........... G06F 11/2043 712/203 |
| 2010/0074542 | A1 | 3/2010 | Lee et al. |
| 2010/0077185 | A1* | 3/2010 | Gopalan ............... G06F 9/5033 712/220 |
| 2012/0317568 | A1* | 12/2012 | Aasheim ............ G06F 9/45558 718/1 |
| 2013/0132062 | A1 | 5/2013 | Hieda |
| 2014/0129808 | A1* | 5/2014 | Naveh .................. G06F 9/4856 712/225 |
| 2014/0173311 | A1* | 6/2014 | Park ....................... G06F 1/206 713/320 |

FOREIGN PATENT DOCUMENTS

KR       1020130112180 A    10/2013

* cited by examiner

*Primary Examiner* — Diem Cao
(74) *Attorney, Agent, or Firm* — William Park & Associates Ltd.

(57) ABSTRACT

Provided are an apparatus and method for multicore emulation based on dynamic context switching. The apparatus for multicore emulation based on dynamic context switching includes a multicore emulation managing unit configured to transmit a signal for requesting determination of a core to be emulated among a plurality of cores, and a context switching managing unit configured to receive the signal for requesting determination of a core to be emulated from the multicore emulation managing unit, determine an ID of a core to be emulated according to the received signal, and executing emulation on a core corresponding to the determined core ID.

12 Claims, 6 Drawing Sheets

APPARATUS AND METHOD FOR MULTICORE EMULATION BASED ON DYNAMIC CONTEXT SWITCHING

CROSS-REFERENCE TO RELATED APPLICATIONS

This application claims priority under 35 U.S.C. §119 to Korean Patent Application No. 10-2014-0010560, filed on Jan. 28, 2014, the disclosure of which is incorporated herein by reference in its entirety.

TECHNICAL FIELD

The present invention relates to an apparatus and method for multicore emulation based on dynamic context switching.

BACKGROUND

Recently, with the advent of various next-generation smartphones, portable devices, and smart TVs, fusion processors integrating a multicore processor and a graphic accelerator have been developed to support various tangible 2D and 3D graphic processing.

Processors used in smartphones have evolved from a single core to dual-cores and anticipated to be advanced toward multi-cores of quad-cores or greater in the light of the development of processors and miniaturization trend of devices.

Also, a multicore processor integrating tens to hundreds of processors is expected to be applied to next-generation mobile terminals to implement biometrics and augmented reality.

Related art processors have performance improved by increasing a clock speed; however, an increase in speed leads to an increase in power consumption and generation of a larger amount of heat.

A multicore processor proposed to address the problem includes several cores, whereby individual cores may operate at a low frequency and power consumed by a single core may be distributed to several cores.

Installing a multicore processor equals installing two or more central processing units, and thus, an operation performed with a program supporting a multicore processor may be faster than that with a single core processor.

Also, when an operation is performed with the program supporting a multi-core processor, high performance can be secured in operations such as video compression and decompression, execution of games of high specification, implementation of augmented reality, and the like, in next-generation mobile terminals based on multimedia processing, compared to a single processor.

In order to develop an optimal multicore processor-based system on chip (SoC) structure, a design method at the level of a virtual platform-based system for initially analyzing functions and performance of SoC at a high level is required. A critical key factor in designing a virtual platform is designing an emulator that models a function of a multicore accurately.

Current multicore emulators support only emulation of a multicore processor operating with the same frequency on a chip in actuality and cannot provide a function of emulating a function of a multicore operating with different operating frequencies.

Figure 1:
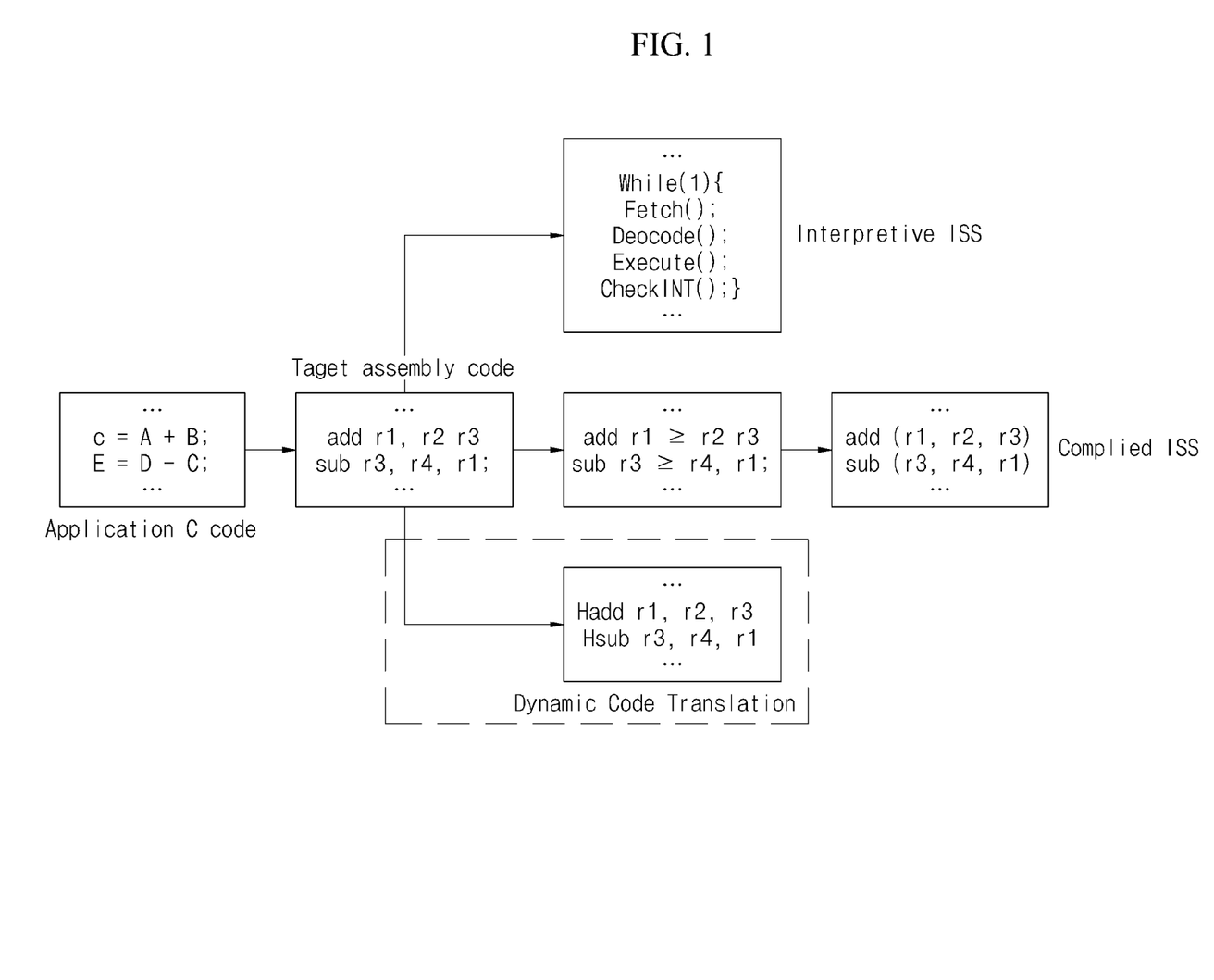
FIG. 1 is a conceptual view illustrating the related art processor core emulation scheme.

As illustrated in FIG. 1, related art processor core emulation schemes include an interpretive instruction set simulation (ISS) scheme as a scheme of emulation by modeling a pipeline of a processor core, a compile ISS scheme, and a dynamic code translation (DCT) scheme of emulation by translating a target code into a host machine code.

The interpretive ISS, a commercial ISS simulator, is ARMulator such as axd, rvdebuger, or the like, and the compile ISS is a scheme of emulating a processor core at a speed about 1000 times faster than interpretive ISS.

In order to develop a driver, firmware, and an application in a virtual platform emulator, a high speed emulation technique of a processor core with a speed of 10 to 100 MIPS is required.

In the related art, a processor core emulation scheme of performing host code execution directly in a host machine, rather than performing a target code based on DCT, is used.

Figure 2:
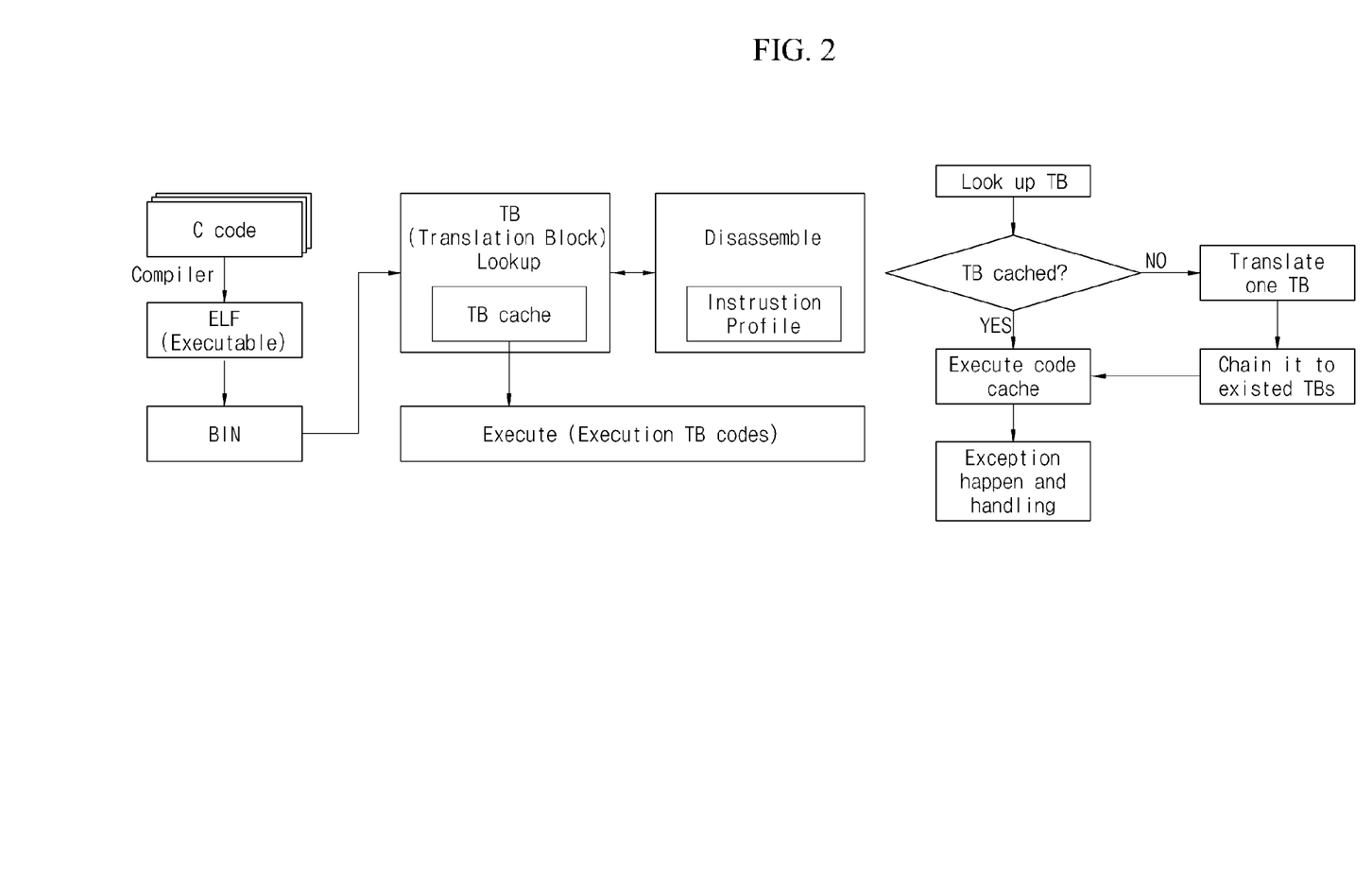
FIG. 2 is a conceptual view illustrating the related art high speed emulation scheme based on dynamic code translation (DCT).

FIG. 2 is a conceptual view illustrating a related art high speed emulation scheme based on DCT, in which a command is read from a binary image to search for a translation block (TB), and when the corresponding TB does not exist in a cache, a disassembling process is performed during which a function of an instruction is recognized and converted into a host machine (x86) command set.

The TB is stored in a TB cache. The TV may be executed as a function of a host machine as soon as it is stored.

When the same instruction is to be performed later, the already cached TB is retrieved from the TB cache, omitting a disassembling process consuming a great deal of time, and thus, an emulation speed may be increased by about 10 times, compared to a case in which the disassembling process is performed each time.

Figure 3:
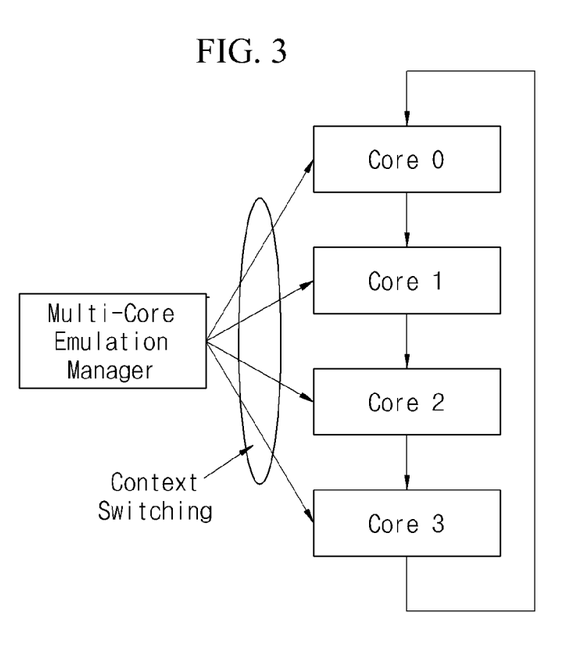
FIG. 3 is a conceptual view illustrating the related art multicore context switching scheme.

FIG. 3 is a conceptual view illustrating a multicore context switching scheme according to the related art. As illustrated in FIG. 3, an emulation scheme of four multicore processors based on DCT is realized with a multicore emulation manager that handles context switching between cores, and the multicore emulation manager emulates the four cores by performing context switching thereon in a sequential manner (Round-Robin manner).

In such a case, a workload allocation ratio of the cores (core 1 to core 4) is 1:1:1:1, and only emulation of multicore processors operating with the same frequency is supported.

Namely, the related art multicore context switching scheme illustrated in FIG. 3 cannot emulate functions of multi-cores operating with different operating frequencies on a chip in actuality.

SUMMARY

Accordingly, the present invention provides an apparatus and method for multicore emulation based on dynamic context switching capable of emulating functions of multi-cores operating with different operating frequencies on a chip in actuality by dynamically allocating different workloads to processor cores during execution of multicore emulation.

In one general aspect, an apparatus for multicore emulation based on dynamic context switching includes: a multicore emulation managing unit configured to transmit a signal for requesting determination of a core to be emulated among a plurality of cores; and a context switching managing unit configured to receive the signal for requesting determination of a core to be emulated from the multicore emulation managing unit, determine an ID of a core to be emulated according to the received signal, and executing emulation on a core corresponding to the determined core ID.

In another general aspect, a method for multicore emulation based on dynamic context switching includes: receiving a signal for requesting determination of a core to be emulated; searching for an ID of a core to be emulated according to the received signal for requesting determination of a core to be emulated; and executing emulation on a core corresponding to the ID according to the core ID search results.

In another general aspect, an apparatus for multicore emulation based on dynamic context switching includes: a context switching manager configured to receive a context switching count value, search for a corresponding core ID with respect to a plurality of cores operating at different operating frequencies according to the received context switching count value, and execute emulation on a corresponding core when the core corresponding to the core ID exists.

DETAILED DESCRIPTION OF EMBODIMENTS

Hereinafter, embodiments of the present invention will be described in detail with reference to the accompanying drawings.

Figure 4:
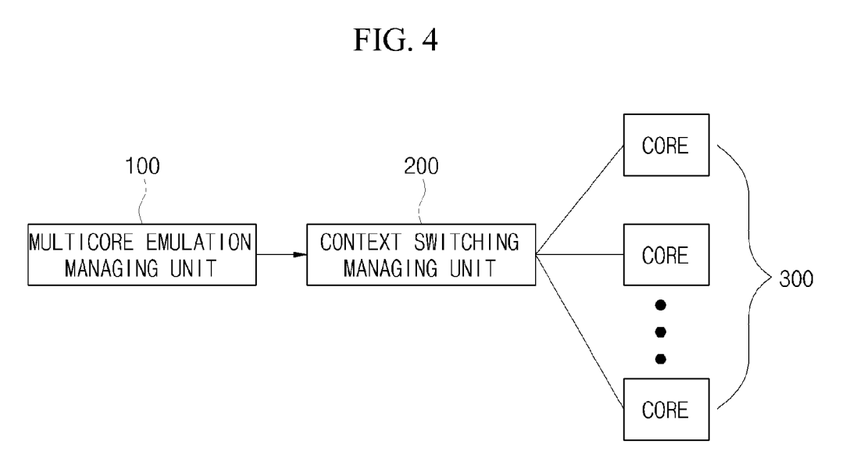
FIG. 4 is a block diagram illustrating an apparatus for multicore emulation based on dynamic context switching according to an embodiment of the present invention.

FIG. 4 is a block diagram illustrating an apparatus for multicore emulation based on dynamic context switching according to an embodiment of the present invention.

As illustrated in FIG. 4, the apparatus for multicore emulation based on dynamic context switching includes a multicore emulation managing unit 100 configured to transmit a signal requesting determination of a core to be emulated among from among a plurality of cores and a context switching managing unit 200 configured to receive a signal for requesting determination of a core to be emulated, determine an identification (ID) of the core to be emulated according to the received signal, and emulate the core corresponding to the determined core ID.

The multicore emulation managing unit 100 transmits a context switching count value and transmits a signal for requesting determination of a core to be emulated from among a plurality of cores 300 to the context switching managing unit 200.

The context switching managing unit 200 receives the context switching count value from the multicore emulation managing unit 100 and searches a context switching table for a core ID using the received context switching count value.

The context switching table generated by the context switching managing unit 200 is a table storing IDs of the plurality of cores 300 executed according to a contact switching count value. The context switching managing unit 200 searches the context switching table for a corresponding core ID using the context switching count value received from the multicore emulation managing unit 100.

The context switching table is configured as a table including core IDs executed according to each of context switching count values previously stored by determining a performance ratio of each of the cores 300 based on a workload of each of the cores 300 allocated according to a ratio of operating frequencies of the cores 300.

When there is no corresponding core ID in the context switching table according to results of searching the context switching table based on the context switching count value, the context switching managing unit 200 sets a core ID to an initial value 0.

When a core corresponding to the determined core ID, the context switching managing unit 200 executes emulation on the corresponding core, and when emulation executed on the corresponding core is terminated, the context switching managing unit 200 increases the received context switching count value by 1 and transmits emulation termination information to the multicore emulation managing unit 100.

Figure 5:
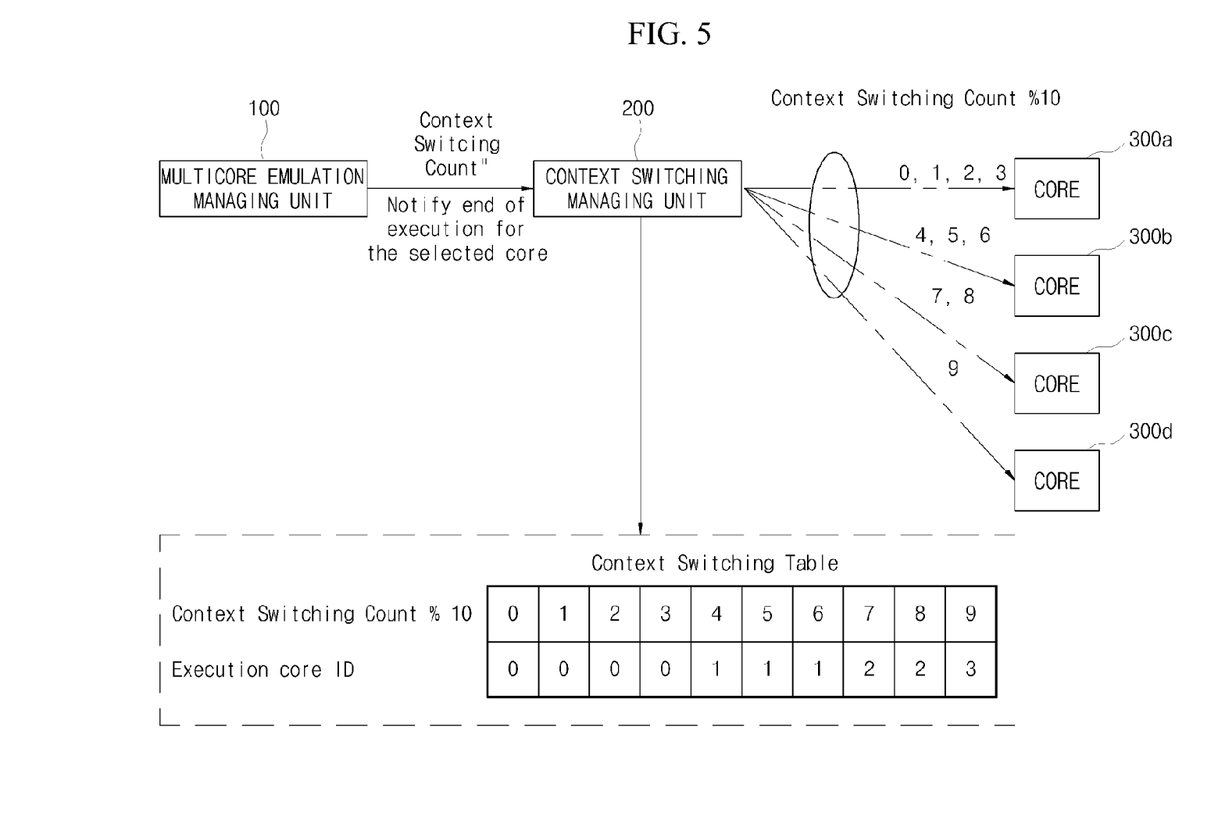
FIG. 5 is a conceptual view illustrating context switching of the apparatus for multicore emulation based on dynamic context switching according to an embodiment of the present invention.

FIG. 5 is a conceptual view illustrating context switching of the apparatus for multicore emulation based on dynamic context switching according to an embodiment of the present invention.

As illustrated in FIG. 5, the multicore emulation managing unit 100 transmits a context switching count value to the context switching managing unit 200.

For example, when operating frequencies of core 0 300a, core 1 300b, core 2 300c, and core 3 300d operating on a chip in actuality are 400 MHz, 300 MHz, 200 MHz, and 100 MHz, respectively, the context switching table allocates workloads to each of the cores to 0 to 9 as remainder values obtained by dividing a context switching count value by 10, in the ratio of 4:3:2:1.

Namely, the core 0 is a core ID executed when remainder values obtained by dividing a context switching count value by 10 is 0, 1, 2, and 3, the core 1 is a core ID executed when remainder values obtained by the context switching count value by 10 are 4, 5, and 6, the core 2 is a core ID executed when remainder values obtained by the context switching count value by 10 are 7 and 8, and the core 3 is a core ID executed when a remainder value obtained by the context switching count value by 10 is 9.

Namely, a performance ratio of the core 0 and the core 3 is 4:1, and an execution core ID value of the context switching table may be reconfigured before or while execution of emulation.

According to an embodiment of the present invention, a multicore system including multiple cores operating with different operating frequencies on a chip in actuality may be implemented by setting a performance ratio of a plurality of cores by allocating different workloads to the cores having different operating frequencies.

Figure 6:
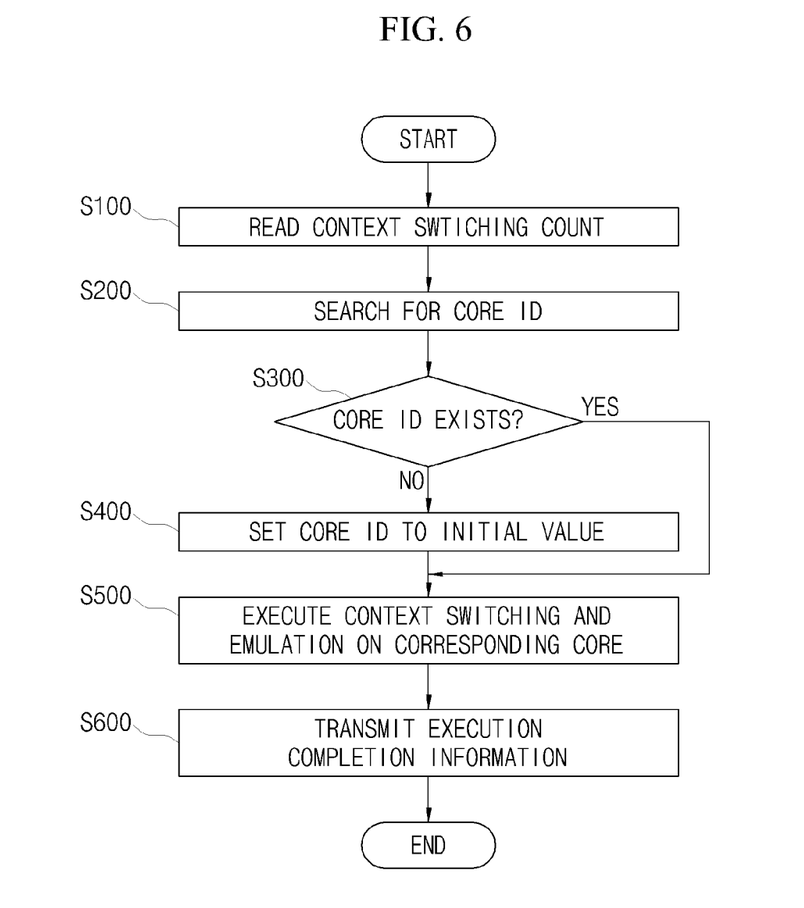
FIG. 6 is a flow chart illustrating a method for multicore emulation based on dynamic context switching according to an embodiment of the present invention.

FIG. 6 is a flow chart illustrating a method for multicore emulation based on dynamic context switching according to an embodiment of the present invention.

As illustrated in FIG. 6, the method for multicore emulation based on dynamic context switching includes a step (S100) of receiving a signal for requesting determination of a core to be emulated, a step (S200) of searching for an ID of a core to be emulated according to the received signal for requesting determination of a core to be emulated, and a step (S500) Of executing emulation on the core corresponding to the ID according to the core ID search results.

In the step (S100) of receiving a signal for requesting determination of a core to be emulated, a context switching count value is received from the multicore emulation managing unit 100 to receive a signal for requesting determination of a core to be emulated, and an ID of a core is searched using a context switching table that stores core IDs of a plurality of cores executed according to the received context switching value.

The method for multicore emulation based on dynamic context switching according to an embodiment of the present invention further includes a step (S400) of setting a core ID to an initial value 0 when there is no corresponding core according to the results of searching for a core ID using the context switching table.

In the step (S200) of searching a core ID, a core ID is searched using a context switching table in which a workloads (according to the example of FIG. 5, a ratio of workloads allocated to the core 0 to core 3 is 4:3:2:1) is allocated to each of a plurality of cores according to a ratio of operating frequencies of the plurality of cores (according to the example of FIG. 5, a ratio of the operating frequencies of the core 0 to core 3 is 4:3:2:1).

The method for multicore emulation based on dynamic context switching further includes a step (S600) of transmitting emulation execution completion information to a multicore emulation manager when execution of emulation on a core corresponding to the core ID is completed. Here, in the step (S600) of transmitting emulation execution completion information, a received context switching count value is increased by 1 according to the emulation execution completion.

An apparatus for multicore emulation based on dynamic context switching according to another embodiment of the present invention includes a context switching manager configured to receive a context switching count value, search for a corresponding core ID among a plurality of cores operating at different operating frequencies according to the received context switching count value, and execute emulation on a corresponding ID when the core corresponding to the core ID exists.

When emulation executed on the corresponding core is completed, the context switching manager transmits emulation completion information to the multicore emulation manager and increases the received context switching count value.

The context switching manager searches for the corresponding core ID using a context switching table in which workloads are allocated according to a ratio of different operating frequencies of a plurality of cores, and when a core ID corresponding to the context switching count value does not exist according to the core ID search results, the context switching manager sets the core ID to an initial value.

The apparatus for multicore emulation based on dynamic context switching according to another embodiment of the present invention further includes a context switching table reconfiguring unit configured to reconfigure the context switching table according to the operating frequencies and allocation of workloads before or during execution of emulation.

The apparatus and method for multicore emulation based on dynamic context switching according to an embodiment of the present invention can support emulation of multiple cores operating with different operating frequencies on a chip in actuality by dynamically allocating a different workload to each of the processor cores.

The present invention can be applied to integrated emulation on a virtual platform for the development of an optimal multicore processor-based SoC structure, a multicore-based high performance SoC emulation, or the like.

In designing a virtual platform-based system for initially analyzing functions and performance of an SoC at a high level in order to develop an optimal multicore processor-based SoC structure, an emulator modeling functions of multi-core accurately can be designed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for multicore emulation based on dynamic context switching, the apparatus comprising:
 a multicore emulation managing unit configured to transmit a signal for requesting determination of a core to be emulated among a plurality of cores; and
 a context switching managing unit configured to receive the signal for requesting determination of a core to be emulated from the multicore emulation managing unit, determine an ID of a core to be emulated according to the received signal, and executing emulation on a core corresponding to the determined core ID,
 wherein the plurality of cores are executed according to a workload for each of the plurality of cores,
 wherein the multicore emulation managing unit transmits a context switching count value to the context switching managing unit,
 wherein the context switching managing unit receives the context switching count value from the multicore emulation managing unit, and searches a context switching table for a core ID using the received context switching count value,
 wherein the context switching managing unit searches for the core ID using a context switching table storing core IDs of the plurality of cores executed according to the context switching count value, and
 wherein the context switching managing unit searches for the core ID using a context switching table in which the workload is allocated to each of the plurality of cores according to a ratio of operating frequencies of the plurality of cores.

2. The apparatus of claim 1, wherein when a corresponding core does not exist in the context switching table according to the search results based on the context switching count value, the context switching managing unit sets a core ID to an initial value.

3. The apparatus of claim 1, wherein when emulation of the core corresponding to the determined core ID is terminated, the context switching managing unit increases the context switching count value and transmits emulation termination information to the multicore emulation managing unit.

4. A method for multicore emulation based on dynamic context switching, the method comprising:
 receiving a signal for requesting determination of a core to be emulated;

searching for an ID of a core to be emulated according to the received signal for requesting determination of a core to be emulated; and executing emulation on a core corresponding to the ID according to the core ID search results, wherein a plurality of cores are executed according to a workload for each of the plurality of cores, wherein the receiving of a signal for requesting determination of a core to be emulated comprises receiving a context switching count value to receive a signal for requesting determination of a core to be emulated, wherein the searching for a core ID comprises searching for a core ID using a context switching table storing core IDs of the plurality of cores executed according to the received context switching value, and wherein the searching for a core ID comprises searching for a core ID using a context switching table in which the workload is allocated to each of the plurality of cores according to a ratio of operating frequencies of the plurality of cores.

5. The method of claim 4, further comprising: when a corresponding core does not exit according to the core ID search results, setting a core ID to an initial value, wherein the initial value is set to 0.

6. The method of claim 4, further comprising: when execution of emulation of a core corresponding to the core ID determined according to the core ID search results is completed, transmitting emulation execution completion information.

7. The method of claim 6, wherein the transmitting of emulation execution completion information comprises increasing the received context switching count value according to transmission of the emulation execution completion information.

8. An apparatus for multicore emulation based on dynamic context switching, the apparatus comprising:

a context switching managing device configured to receive a context switching count value, search for a corresponding core ID with respect to a plurality of cores operating at different operating frequencies according to the received context switching count value, and execute emulation on a corresponding core when the core corresponding to the core ID exists, wherein the plurality of cores are executed according to a workload for each of the plurality of cores, and wherein the context switching managing device searches for the corresponding core ID using a context switching table with respect to the plurality of cores with the workload previously allocated according to a ratio of different operation frequencies.

9. The apparatus of claim 8, wherein when execution of the emulation on the corresponding core is completed, the context switching manager transmits emulation execution completion information to a multicore emulation manager.

10. The apparatus of claim 9, wherein when execution of the emulation on the corresponding core is completed, the context switching manager increases the context switching count value.

11. The apparatus of claim 8, wherein when the core ID corresponding to the context switching count value does not exist according to the corresponding core ID search results, the context switching manager sets a core ID to an initial value.

12. The apparatus of claim 8, further comprising a context switching table reconfiguring unit configured to reconfigure the context switching table according to operating frequencies and workload allocation before or during execution of emulation.

* * * * *